United States Patent [19]

Hirota

[11] Patent Number: 5,141,824
[45] Date of Patent: Aug. 25, 1992

[54] FUEL-CELL POWER-GENERATION SYSTEM

[75] Inventor: Toshio Hirota, Kawasaki, Japan

[73] Assignee: Fuji Electric Co., Ltd., Kawasaki, Japan

[21] Appl. No.: 694,785

[22] Filed: May 2, 1991

[30] Foreign Application Priority Data

May 10, 1990 [JP] Japan .................................. 2-120603

[51] Int. Cl.⁵ .............................................. H01M 8/04
[52] U.S. Cl. .......................................... 429/23; 429/34
[58] Field of Search ................ 429/22, 23, 25, 17, 429/34, 38, 39

[56] References Cited

U.S. PATENT DOCUMENTS

| 4,411,967 | 10/1983 | Yano | 429/23 |
| 4,657,829 | 4/1987 | McElroy et al. | 429/23 X |
| 4,677,637 | 6/1987 | Takabayashi | 429/23 X |

Primary Examiner—Anthony Skapars
Attorney, Agent, or Firm—Spencer, Frank & Schneider

[57] ABSTRACT

A plurality of fuel-cell stacks operated in electrically parallel connection are individually controlled for amounts of reaction gases fed thereto corresponding to ratios of allotment of load thereto such that each of the stacks can maintain standard gas utilization factor. Among the fuel-cell stacks operated in parallel connection, those stacks which have particularly small ratios of allotment of load are controlled so that their gas utilization factors are changed to be decreased, thus controlling the amounts of the reaction gases to be increased.

4 Claims, 3 Drawing Sheets

FUEL-CELL POWER-GENERATION SYSTEM

BACKGROUND OF THE INVENTION

1. Field of the Invention

The present invention relates to a fuel-cell power-generation system which includes a plurality of fuel-cell stacks and provides a large quantity of electric power.

2. Description of the Prior Art

As is well known, fuel cells are a continuously operating type electrochemical power-generation system which includes a stack comprising many unit cells superimposed one on another, the stack having a fuel electrode and an oxidant electrode, and which operates by supplying hydrogen gas to the fuel electrode side and oxygen (air) to the oxidant electrode side of the stack to allow electrochemical reaction between the hydrogen and oxygen to take place, and converting energy from such a reaction directly and efficiently into direct-current electrical energy.

In the fuel-cell of this type, because of limitations posed thereon in the power capability per stack, i.e., the size of a unit cell, and number of superimposed cells, in view of restrictions from production technologies, and those from transportable size; it is difficult to provide stacks having power capabilities of actually required levels. In particular, it is currently a major problem to increase the power capability of fuel-cell power-generation plant. However, in order to obtain a fuel-cell power-generation plant having a high power capability, it is necessary to combine a plurality of stacks of one and the same specification with each other so that the stacks can be connected electrically in parallel connection or in series-parallel connection because there is a limitation on the power capability per stack of the fuel-cell power-generation system.

In the case where the fuel-cell system with a plurality of stacks in parallel connection is to be operated as described above, some modifications have been made to the single-stack fuel-cell construction. First, a fuel feed line arranged between the stack and a fuel reformer, which converts natural gas or the like as a raw fuel into a hydrogen-rich fuel usable in the fuel-cell system, and an air feed line arranged between the air blower and the stack have in their mid portion a plurality of sublines or branch lines branched therefrom the number of which corresponds to the number of the stacks used, the branch lines being connected to the corresponding stacks, respectively. Then, based on a standard utilization factor of fed gas which has been set up to such a level that the system can operate as a power generation and electricity supply system in the best power-generation efficiency. (e.g., hydrogen utilization factor: 75%, oxygen utilization factor: 50%), the gas is distributed to each stack through each branch line with controlling the amount thereof being controlled collectively.

Generally, even among fuel-cell stacks designed and produced in accordance with the same specification, the power characteristics (current-voltage or I-V characteristics) of the unit cells would be different to some extent from individual to individual as shown in FIG. 1, due to fluctuation or difference in the quality of parts such as electrodes constituting the unit cell, the amount of electrolyte impregnated in each unit cell, and the conditions under which the unit cell is operated. To note, FIG. 1 shows respective I-V characteristics for two fuel-cell stacks A and B.

Assuming the case where a power-generation system is used which comprises two fuel-cell stacks A and B with different cell power output characteristics, electrically connected to each other in parallel connection, and is operated with feeding the reaction gas such that its amount necessary for the overall system calculated from the electric load and standard gas utilization factor is divided into two parts, one for the stack A and the other for the stack B. In this case, as will be apparent from FIG. 1, some difference arises between currents $I_A$ and $I_B$ (current for the overall system being $I_A + I_B$) allotted to the stacks A and B, respectively, for establishing an output voltage $V_O$. More specifically, the electric load is allotted to the fuel-cell stacks A and B unevenly or based on other than fifty-fifty basis, but one of the two stacks, e.g., the stack A, having a low cell characteristics has a smaller ratio of allotment of the load and on the contrary the other, stack B, having a high cell characteristics has a greater ratio of allotment of the load.

As the amounts of hydrogen and oxygen consumed by the fuel-cell power-generation system is proportional to the amount of current with a coefficient of the Faraday constant, the uneven allotment of the electric load between the stacks A and B results in that the hydrogen and oxygen would not be consumed in accordance with the predetermined utilization factors of the gases in the stack A, with a relatively small ratio of allotment of electric load and less current and unused gases are discharged to the outside of the system, whereas in the stack B with a relatively great ratio of allotment of electric load the amounts of reaction gases are insufficient as compared with the current allotted to the stack B, thus increasing the gas utilization factor to above the standard value and causing the state of so-called gas-deficit operation, i.e., the system is operated in short of fuel gas. Once the fuel-cell power-generation system is run in the state of gas-deficit operation, the occurrence cell reaction is localized at the gas inlet side of each unit cell, and as a result localized overheating occurs in the unit cell. This localized overheating not only decreases the output characteristics of the system but also injures the cell to shorten the cell-life, and thus in the worst case it is impossible to operate the system.

As general characteristics of fuel cells, it is known that continuous operation of fuel cells at high loads results in increased amount of electrolytes scattered, which increases the rate at which the characteristics of the fuel cell are deteriorated. Accordingly, in order to prolong the cell-life for the entire power-generation system, it is necessary to operate the system at ratios of allotment of load for respective fuel-cell stacks arranged in parallel connection as even as possible among the stacks.

SUMMARY OF THE INVENTION

An object of the present invention is to provide a fuel-cell power-generation system in which feed of reaction gases to a plurality of stacks is controlled in an improved manner.

Another object of the present invention is to provide a fuel-cell power-generation system which is free of the state of gas-deficit that tends to occur in some of the stacks and which has an equalized ration of proportion of allotment of load for each stack.

Still another object of the present invention is to provide a fuel-cell power-generation system with an increased power-generation efficiency.

According to the first aspect of the present invention, there is provided a fuel-cell power-generation system comprising:

a plurality of fuel-cell stacks with inlets and outlets for reaction gases and having a predetermined rated power output and electrically connected in parallel or series-parallel connection to each other and generate power upon being fed with reaction gases separately, said fuel-cell stacks having respective electric power output circuits;

reaction gas feed lines connected to said fuel-cell stacks, respectively;

load detecting means for detecting respective electric loads allotted to said stacks, said load detecting means being attached to said respective electric power output circuits;

flow control valves provided with said reaction gas feed lines at respective inlet side portions thereof; and flow control means for controlling respective opening ratios of said flow control valves separately based on said respective loads of said stacks detected by said load detecting means and on predetermined standard gas utilization factors for said respective stacks.

Here, the system may further comprise reaction gas circulation lines connected to the stacks so that a portion of the reaction gas discharged from the outlets of the stacks is recycled to the inlets of the stacks.

According to the second aspect of the present invention, there is provided a fuel-cell power-generation system comprising:

a plurality of fuel-cell stacks with inlets and outlets for reaction gases and having a predetermined rated power output and electrically connected in parallel or series-parallel connection to each other and generate power upon being fed with reaction gases separately, said fuel-cell stacks having respective electric power output circuits;

reaction gas feed lines connected to said fuel-cell stacks, respectively;

load detecting means for detecting respective electric loads allotted to said stacks, said load detecting means being attached to said respective electric power output circuits;

flow control valves provided with said reaction gas feed lines at respective inlet side portions thereof; and flow control means for controlling respective opening ratios of said flow control valves separately based on said respective loads of said stacks detected by said load detecting means and on predetermined standard gas utilization factors for said respective stacks, wherein for a first stack group consisting of at least one of said stacks that has a ratio of allotment of load calculated from value of load detected by said load detecting means is greater than an average value of ratios of allotment of load detected by said load detecting means, said flow control means controls separately said opening of said at least one stack of said first stack group such that said gas utilization factor for said at least one stack of said first stack group can be maintained at a predetermined standard value, and for a second stack group group consisting at least one of said stacks that has a ratio of allotment of load calculated from value of load detected by said load detecting means is smaller than the average value of ratios of allotment of load of all the stacks detected by said load detecting means, said flow control means controls separately said opening of said at least one stack of said second stack group such that said gas utilization factor for said at least one stack of said second stack group can be changed to a value lower than said predetermined standard value to feed said reaction gas in an increased amount.

Here, the system may further comprise reaction gas circulation lines connected to the stacks so that a portion of the reaction gas discharged from the outlets of the stacks is recycled to the inlets of the stacks.

According to the present invention, as stated above, a plurality of fuel-cell stacks operated in parallel connection can receive the reaction gases in amounts corresponding to the ratios of allotment of load so that the standard gas utilization factors can be maintained at constant levels even when different fuel-cell stacks have different ratios of allotment of load, i.e., different load currents flow in different stacks, due to the difference in power output characteristics among the fuel-cell stacks. More specifically, the amounts of the reaction gases are increased for the fuel-cell stacks which have larger ratios of allotment of load, and on the contrary the amounts of the reaction gases are decreased for the stacks which have smaller ratios of allotment of load. This stabilizes the gas utilization factors of the reaction gases consumed in the respective fuel-cell stacks so that not only the entire power generation system can maintain a high power generation efficiency but also one or more fuel-cell stacks that have particularly large ratios of allotment of load can be prevented from being operated in a gas-deficit state.

Further, according to the present invention, those fuel-cell stacks which have particularly low cell power characteristics and relatively small ratios of allotment of load have improved cell characteristics because the amounts of the reaction gases are controlled so that they can be increased to lower the gas utilization factors to levels below the standard value. This results in equalized allotment of load among the fuel-cell stacks so that power-generation efficiency of the entire fuel-cell power-generation system can be increased and early deterioration of the cell characteristics can be prevented.

Further, according to the present invention, for the power generation system in which the fuel-cell stacks each of which is provided with a reaction gas circulation line, the composition of the reaction gases can always be maintained in a proper state to allow the system to exhibit a high power-generation efficiency.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Hereinafter, the present invention will be described in more detail by embodiments.

EMBODIMENT 1

Figure 2:
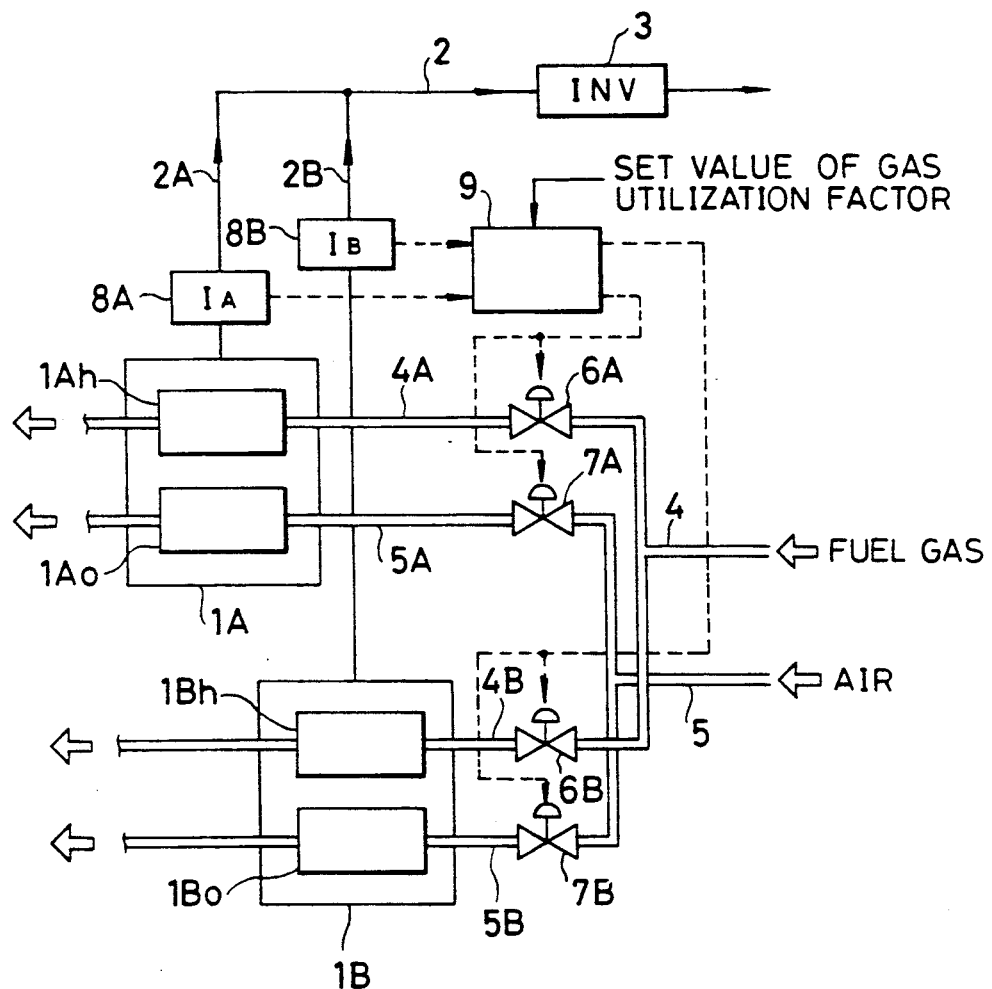
FIG. 2 is a block diagram showing an embodiment of a fuel-cell power-generation system according to the present invention.

FIG. 2 is a block diagram of showing one embodiment of a fuel-cell power-generation system according to the present invention. The system is an example of the type in which there are two stacks electrically connected to each other in parallel connection.

As shown in FIG. 2, fuel-cell stacks 1A and 1B are connected to an electric output circuit 2 through branch circuits 2A and 2B thereof in parallel connection, respectively. In the electric output circuit 2 is provided an inverter 3 which converts direct currents outputted from the stacks 1A and 1B into alternate current.

Fuel gas feed line 4 is provided to connect a fuel gas reformer (not shown) to the stacks 1A and 1B and provides a fuel gas to each of the stacks 1A and 1B. The fuel gas feed line 4 has a branch line 4A connected to a fuel electrode $1A_h$ and a branch line 4B connected to a fuel electrode $1B_h$.

An air feed line 5 is provided to connect an air blower (not shown) to the stacks 1A and 1B, and feeds air from the air blower to each of the stacks 1A and 1B. The air feed line 5 has a branch line 5A connected to an oxidant electrode $1A_o$ of the stack 1A and a branch line 5B connected to an oxidant electrode $1B_o$ of the stack 1B.

The branch lines 4A and 4B of the fuel feed line 4 are intervened by flow control valves 6A and 6B, respectively, near the respective inlets of the stacks 1A and 1B. On the other hand, the branch lines 5A and 5B of the air feed line 5 are provided with flow control valves 7A and 7B, respectively, near the respective inlets of the stacks 1A and 1B.

The parallel connected branch circuits 2A and 2B of the electric output circuit 2 are intervened by ammeters (load detecting means) 8A and 8B, respectively, for measuring output currents $I_A$ and $I_B$ of the stacks 1A and 1B, respectively.

The electric output circuit 2 is intervened by a flow control portion (flow control means) 9. The flow control portion 9 calculates appropriate amounts of fuel gas and of air to be fed to the stacks 1A and 1B based on detect signals from the load detectors 8A and 8B, and on predetermined standard values of gas utilization factors (for example, hydrogen utilization factor: 75%, oxygen utilization factor: 50%), and send instruction signals to respective governors (not shown) of the flow control valves 6A and 6B as well as of the flow valves 7A and 7B to control the open area ratios of the valves.

Figure 1:
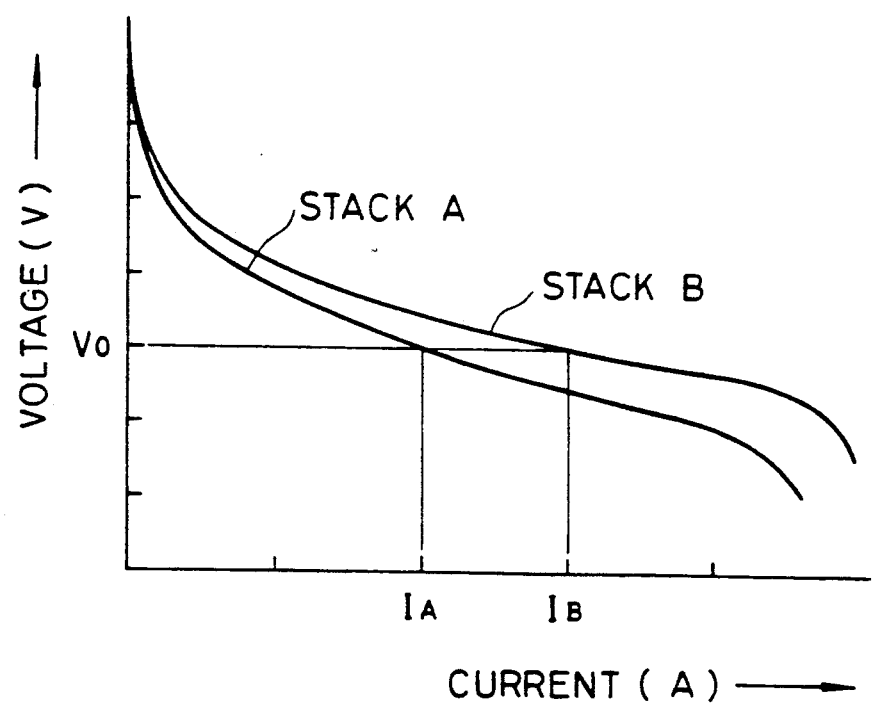
FIG. 1 is a graph showing a relationship between the current and voltage of a fuel-cell stack.

Considering a situation in which the stacks 1A and 1B in the system of the above-described construction are operated in a state where there is difference between the output currents $I_A$ and $I_B$ as shown in FIG. 1 due to the difference in the cell characteristics between the stacks 1A and 1B.

For the stack 1A which has a relatively small ratio of allotment of load, in other words, small output current, the necessary amounts of reaction gases are calculated by the flow control portion 9 based on the detected value of the current $I_A$ obtained by the load detector 8A and the standard gas utilization factors, and based on the results obtained instruction signals are sent to the flow control valves 6A and 7A to decrease under control the feed amounts of the reaction gases fed to the stack 1A.

On the other hand, for the stack 1B which has a relatively large ratio of allotment of load, in other words, large output current, the amounts of reaction gases to be fed to the stack 1B are increased under control by procedures similar to those described above so that the system can be operated at the standard gas utilization factors.

By the above-described control, the stack 1B is free of gas-deficit operation, and the both stacks 1A and 1B can be operated at proper gas utilization factors so that high power-generation efficiencies are attained.

EMBODIMENT 2

This embodiment is another example of the power-generation system described in Embodiment 1. A block diagram of the system in this embodiment is the same as the block-diagram illustrating in FIG. 2. In this embodiment, for the stack 1B which has a ratio of allotment of load larger than the average value, in other words, larger output current, the necessary amounts of reaction gases are calculated by the flow control portion 9 in the same manner as in Embodiment 1 based on the detected value of the current $I_B$ and the standard gas utilization factors, and instruction signals based on the results obtained are sent to the flow control valves 6B and 7B to increase under control the feed amounts of the reaction gases fed to the stack 1B.

On the other hand, for the stack 1A which has a ratio of allotment of load smaller than the average value, in other words, smaller output current, the hydrogen and oxygen utilization factors are changed to levels lower than the standard values by the flow control portion 9 and the degree of opening of the flow control valves 6A and 6B ar controlled so that the necessary amounts of fuel gas and of air to be fed can be increased.

By the above-described control, the cell characteristics of the fuel-cell stack 1A are improved and the difference between the output currents $I_A$ and $I_B$ of the stacks 1A and the stack 1B, respectively, becomes very small, thus giving equalized ratios of allotment of load. As a result, the power-generation efficiency of the entire power-generation system can be increased, and the currents of the fuel-cell stacks having particularly large ratios of allotment of load are decreased so that earlier deterioration of cell characteristics can be prevented and cell-life can be prolonged.

EMBODIMENT 3

Figure 3:
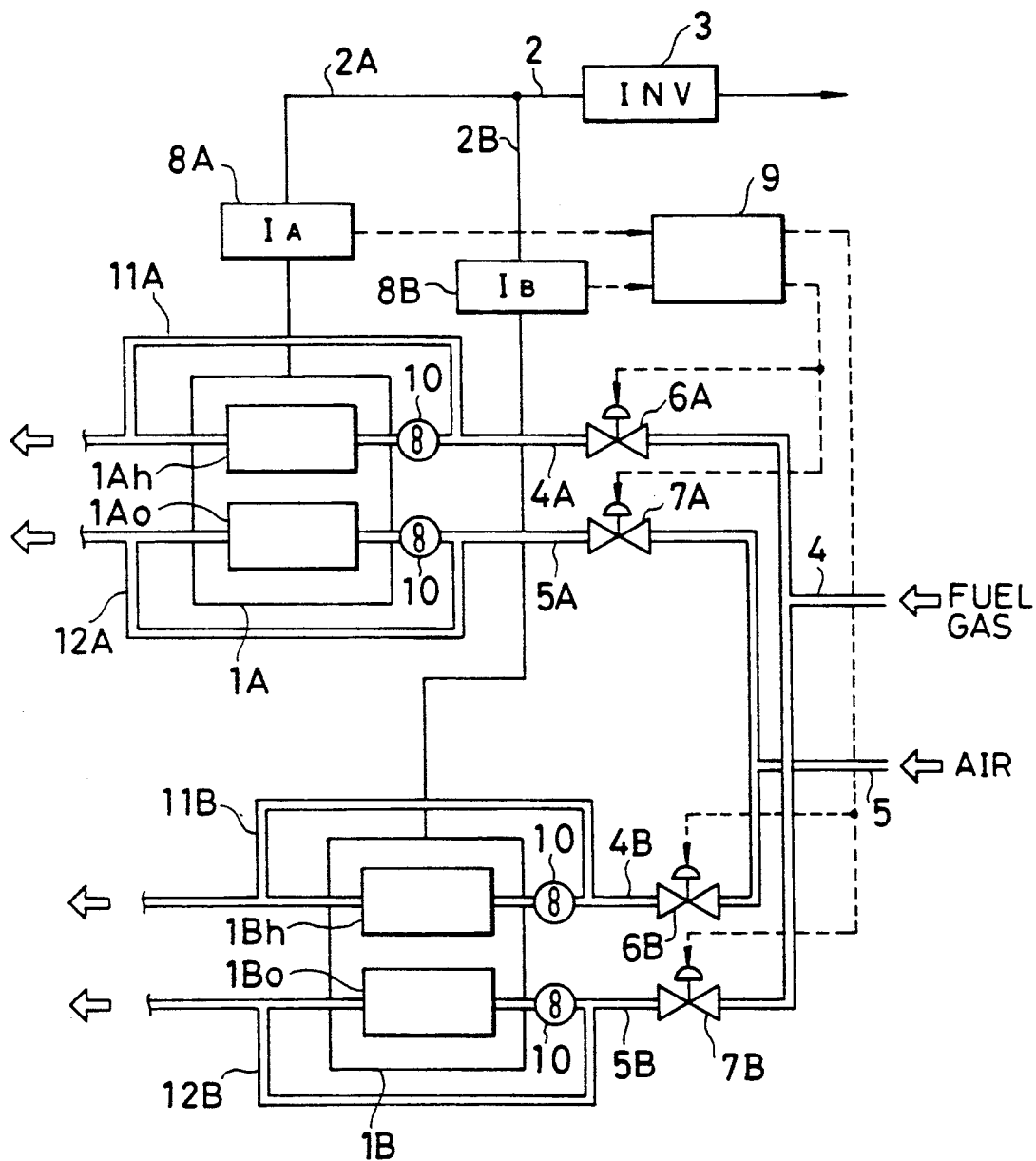
FIG. 3 is a block diagram showing another embodiment of a fuel-cell power-generation system according to the present invention.

The system shown in FIG. 3 includes reaction gas circulation means in addition to the construction of the power-generation system described in Embodiment 1 (FIG. 2). In this system, a blower 10 is intervened in each of the branch lines 4A, 4B, 5A and 5B and near the corresponding stack. Further, the branch lines 4A and 4B are provided with gas circulation lines 11A and 11B, respectively, such that the gas circulation lines are connected at their both ends to the inlet side portion and outlet side portion of the stack 1A and 1B, respectively, with the blower 10 and the stack 1A or 1B being positioned in the inside.

Further, the branch lines 5A and 5B branched from the air feed line are connected to the air circulation lines 12A and 12B, respectively, similarly to the branch lines 4A and 4B above.

In the system according to the instant embodiment, the provision of the gas circulation means of the aforementioned construction makes it possible to operate the system with replenishing fresh fuel gas and fresh air to the inlet side of the stacks, and on the other hand with recycling a portion of off-gas from the outlets of the fuel-cell stacks 1A and 1B to the inlets thereof so that the off-gas can be used again in the cell reaction. It should be noted that recycling of the reaction gas has already been known.

In the reaction gas feed system of the above-described construction, as the hydrogen and oxygen components in the reaction gas are consumed during the passage of the reaction gas through the fuel-cell stacks, the composition of the circulating reaction gas changes corresponding to the state of load, i.e., ratios of allotment of load of the fuel-cell stacks 1A and 1B. Hence, the opening ratios of the flow control valves 6A, 6B, 7A and 7B are controlled based on the value of currents detected for the stacks 1A and 1B in a manner similar to that described in Embodiment 1 or 2, to control feed amounts of fresh fuel gas containing much hydrogen gas and of fresh air containing much oxygen gas so that the system can be operated with maintaining hydrogen and oxygen in proper concentrations.

Although the electric circuit illustrated relates to the embodiment in which two fuel-cell stacks are combined in parallel connection, the present invention may be applied to a system in which four fuel-cell stacks are used every two of which are combined in series connection and the resulting two groups of the series-combined stacks are further combined in parallel connection to thereby obtain two circuits of series-parallel connection.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A fuel-cell power-generation system comprising:
   a plurality of fuel-cell stacks with inlets and outlets for reaction gases and having a predetermined rated power output and electrically connected in parallel or series-parallel connection to each other and generate power upon being fed with reaction gases separately, said fuel-cell stacks having respective electric power output circuits;
   reaction gas feed lines connected to said fuel-cell stacks, respectively;
   load detecting means for detecting respective electric loads allotted to said stacks, said load detecting means being attached to said respective electric power output circuits;
   flow control valves provided with said reaction gas feed lines at respective inlet side portions thereof; and
   flow control means for controlling respective opening ratios of said flow control valves separately based on said respective loads of said stacks detected by said load detecting means and on predetermined standard gas utilization factors for said respective stacks.

2. The fuel-cell power generation system as claimed in claim 1, further comprising reaction gas circulation lines connected to the stacks so that a portion of the reaction gas discharged from the outlets of the stacks is recycled to the inlets of the stacks.

3. A fuel-cell power-generation system comprising:
   a plurality of fuel-cell stacks with inlets and outlets for reaction gases and having a predetermined rated power output and electrically connected in parallel or series-parallel connection to each other and generate power upon being fed with reaction gases separately, said fuel-cell stacks having respective electric power output circuits;
   reaction gas feed lines connected to said fuel-cell stacks, respectively;
   load detecting means for detecting respective electric loads allotted to said stacks, said load detecting means being attached to said respective electric power output circuits;
   flow control valves provided with said reaction gas feed lines at respective inlet side portion thereof; and
   flow control means for controlling respective opening ratios of said flow control valves separately based on said respective loads of said stacks detected by said load detecting means and on predetermined standard gas utilization factors for said respective stacks, wherein for a first stack group consisting of at least one of said stacks that has a ratio of allotment of load calculated from value of load detected by said load detecting means is greater than an average value of ratios of allotment of load detected by said load detecting means, said flow control means controls separately said opening of said at least one stack of said first stack group such that said gas utilization factor for said at least one stack of said first stack group can be maintained at a predetermined standard value, and for a second stack group group consisting at least one of said stacks that has a ratio of allotment of load calculated from value of load detected by said load detecting means is smaller than the average value of ratios of allotment of load of all the stacks detected by said load detecting means, said flow control means controls separately said opening of said at least one stack of said second stack group such that said gas utilization factor for said at least one stack of said second stack group can be changed to a value lower than said predetermined standard value to feed said reaction gas in an increased amount.

4. The fuel-cell power-generation system as claimed in claim 3, further comprising reaction gas circulation lines connected to the stacks so that a portion of the reaction gas discharged from the outlets of the stacks is recycled to the inlets of the stacks.

* * * * *